F. C. LEYPOLDT.

Wire and Sheet-Metal Cutter.

No. 8,714. Reissued May 13, 1879.

Witnesses
Henry Howson Jr.
Harry Smith

Inventor
F. C. Leypoldt
by his Attorneys
Howson and Son

N. PETERS, PHOTO-LITHOGRAPHER, WASHINGTON, D. C.

UNITED STATES PATENT OFFICE.

FREDERICK C. LEYPOLDT, OF PHILADELPHIA, PENNSYLVANIA.

IMPROVEMENT IN WIRE AND SHEET-METAL CUTTERS.

Specification forming part of Letters Patent No. 202,446, dated April 16, 1878; Reissue No. 8,714, dated May 13, 1879; application filed November 11, 1878.

DIVISION B.

*To all whom it may concern:*

Be it known that I, FREDERICK C. LEYPOLDT, of Philadelphia, Pennsylvania, have invented certain Improvements in Instruments for Cutting Wire and Sheet Metal; and I do hereby declare the following to be a full, clear, and exact description of the same.

My invention relates to an improvement in that class of cutting-tools in which an arm carrying one cutter, and pivoted to the body or jaw carrying the other cutter, is combined with a cam-lever by which the said arm is operated to produce the desired cutting effect; and the object of my improvement is to insure the lateral steadiness of the pivoted cutting-arm at the point where power is applied to the same, in the manner described hereinafter, reference being had to the accompanying drawings, representing side views of cutting implements made according to my invention.

A represents the upper cam-lever, for depressing the pivoted cutting-arm; and B, the lower lever or jaw, which is slotted in the usual way, to permit the introduction of the material to be operated upon by the cutters. The steadying-tongue, moreover, is directly below the point where the power of the lever A is exerted on the cutting-arm—a point where steadiness is most desirable. The jaw B is also slotted to admit, as well as to steady and guide, the cutting-arm D, which carries a cutter at its front end, and is pivoted at the rear to the jaw B. Within the slot is a spring, which is shown by dotted lines, and which has a tendency to raise the front end of the pivoted cutter-arm.

As this pivoted arm D is free to vibrate in the slot of the jaw B, the severing of the object between the cutters can be effected by depressing the lever A, on releasing which from pressure the spring will restore the arm D to its normal condition, ready for the introduction between the cutters of another object to be severed.

Figure 1:
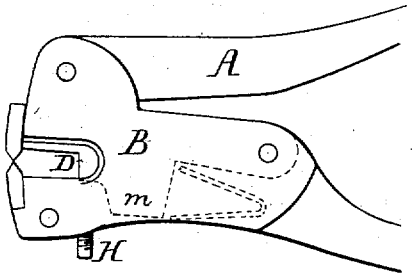
Figure 2:
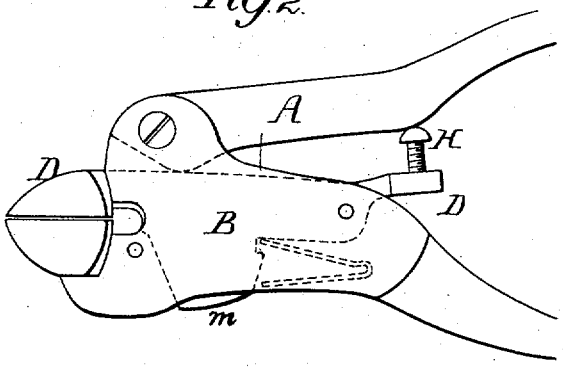

It will be seen, on referring to the dotted lines in the two figures, that the pivoted arm D has a tongue, *m*, situated between the cutters and the pivot, and projecting downward into the slot of the jaw B, and, in Fig. 2, entirely through the slot.

The pivoted cutting-arm is steadied and guided in its movement by the slot in the jaw B, and this steadiness is enhanced by carrying the tongue *m* downward below the edge of the cutter of the jaw B, where the best lateral guiding effect is produced.

In both of the views there is a stop, H, for preventing the cutters from being brought into injurious contact with each other; but this feature I do not claim. Neither do I claim, broadly, an arm carrying at the front one cutter, and pivoted at the rear to a jaw carrying the other cutter, in combination with a lever to operate the said pivoted arm. Neither do I claim, *per se*, the steadying-tongue *m*; but

I claim as my invention—

The slotted cutting-jaw B and the cutting-arm D, carrying at its front end the upper cutter, pivoted at its rear end to the said jaw B, and provided between its pivot and the cutters with a tongue, *m*, in combination with a cam-lever, A, pivoted to the jaw B, and arranged to bear on the cutting-arm D above the tongue *m*, all as set forth.

In testimony whereof I have signed my name to this specification in the presence of two subscribing witnesses.

F. C. LEYPOLDT.

Witnesses:
ALEX. PATTERSON,
HARRY SMITH.